(12) United States Patent
Frykman et al.

(10) Patent No.: US 11,840,017 B2
(45) Date of Patent: Dec. 12, 2023

(54) TECHNIQUES FOR RELEASING PARTS IN ADDITIVE FABRICATION AND RELATED SYSTEMS AND METHODS

(71) Applicant: Formlabs, Inc., Somerville, MA (US)

(72) Inventors: Mark J. Frykman, Durham, NC (US); Mark J. Ripoll, Raleigh, NC (US); Lawrence Cheung, Cambridge, MA (US); Nathan Jeffery, Boston, MA (US); Yoav Reches, Cambridge, MA (US); Derek J. Vilim, Somerville, MA (US)

(73) Assignee: Formlabs, Inc., Somerville, MA (US)

( * ) Notice: Subject to any disclaimer, the term of this patent is extended or adjusted under 35 U.S.C. 154(b) by 0 days.

(21) Appl. No.: 17/845,033

(22) Filed: Jun. 21, 2022

(65) Prior Publication Data

US 2022/0410477 A1    Dec. 29, 2022

Related U.S. Application Data

(60) Provisional application No. 63/214,884, filed on Jun. 25, 2021.

(51) Int. Cl.
*B29C 64/245*    (2017.01)
*B33Y 30/00*    (2015.01)

(52) U.S. Cl.
CPC ........... *B29C 64/245* (2017.08); *B33Y 30/00* (2014.12)

(58) Field of Classification Search
CPC .... B29C 64/124; B29C 64/135; B29C 64/245
See application file for complete search history.

(56) References Cited

U.S. PATENT DOCUMENTS

| 5,253,012 A | 10/1993 | Chiba et al. |
| 10,710,303 B2 | 7/2020 | Broady et al. |

(Continued)

FOREIGN PATENT DOCUMENTS

| CN | 103167946 A | 6/2013 |
| CN | 104191625 A | 12/2014 |

(Continued)

OTHER PUBLICATIONS

Extended European Search Report dated Jun. 25, 2021 in connection with European Application No. 17934081.5.

(Continued)

*Primary Examiner* — Timothy Kennedy
(74) *Attorney, Agent, or Firm* — Wolf, Greenfield & Sacks, P.C.

(57) ABSTRACT

An improved additive fabrication device and a build platform are provided. The additive fabrication device is configured to form layers of material on a build surface. The additive fabrication device comprising: a build platform comprising: a rigid structure; an actuation structure attached to the rigid structure, wherein the actuation structure comprises one or more sheet handles and a flexible sheet, and wherein a first surface of the flexible sheet forms a build surface on which the additive fabrication device is configured to form layers of materials; and the one or more sheet handles are configured to be actuated to apply a force to the flexible sheet while at least a part of the actuation structure remains attached to the rigid structure, to deform at least a part of the flexible sheet away from the rigid structure.

24 Claims, 11 Drawing Sheets

(56) References Cited

U.S. PATENT DOCUMENTS

| | | |
|---|---|---|
| 10,899,077 B2 | 1/2021 | Broady et al. |
| 2005/0173855 A1 | 8/2005 | Dunn et al. |
| 2011/0241947 A1 | 10/2011 | Scott et al. |
| 2013/0242317 A1 | 9/2013 | Leavitt et al. |
| 2013/0270746 A1 | 10/2013 | Elsey |
| 2015/0145174 A1 | 5/2015 | Comb |
| 2016/0052207 A1 | 2/2016 | Bloom |
| 2016/0288427 A1 | 10/2016 | Foley et al. |
| 2016/0332387 A1 | 11/2016 | Jondal et al. |
| 2017/0259507 A1 | 9/2017 | Hocker |
| 2017/0297320 A1 | 10/2017 | Swanson |
| 2018/0043636 A1 | 2/2018 | Flannigan et al. |
| 2019/0030806 A1* | 1/2019 | Herman ............... B29C 64/106 |
| 2019/0047213 A1 | 2/2019 | Stadlmann |
| 2019/0176393 A1 | 6/2019 | Broady et al. |
| 2020/0156317 A1 | 5/2020 | Van Esbroek et al. |
| 2020/0368966 A1 | 11/2020 | Broady et al. |
| 2021/0229353 A1 | 7/2021 | Broady et al. |

FOREIGN PATENT DOCUMENTS

| | | |
|---|---|---|
| CN | 105189092 A | 12/2015 |
| JP | 2000-211031 A | 8/2000 |
| WO | WO 2016/033286 A1 | 3/2016 |
| WO | WO 2016/177893 A1 | 11/2016 |
| WO | WO 2017/161398 A1 | 9/2017 |

OTHER PUBLICATIONS

International Search Report and Written Opinion for International Application No. PCT/US2017/65136, dated Mar. 6, 2018.
International Preliminary Report on Patentability for International Application No. PCT/US2017/065136, dated Jun. 18, 2020.
International Search Report and Written Opinion dated Sep. 15, 2022 in connection with International Application No. PCT/US2022/034269.
U.S. Appl. No. 17/156,925, filed Jan. 25, 2021, Broady et al.
EP 17934081.5, Jun. 25, 2021, Extended European Search Report.
PCT/US2017/65136, Mar. 6, 2018, International Search Report and Written Opinion.
PCT/US2017/65136, Jun. 18, 2020, International Preliminary Report on Patentability.
PCT/US2022/031269, Sep. 15, 2022, International Search Report and Written Opinion.

* cited by examiner

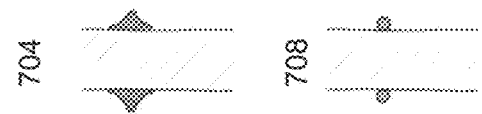
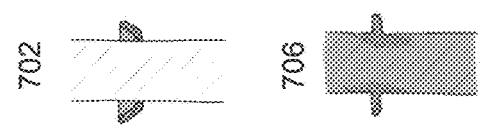
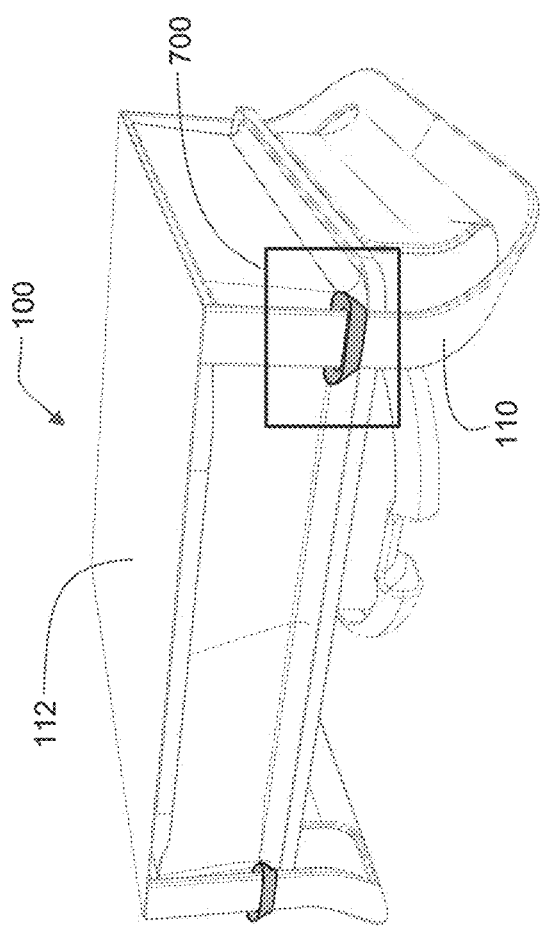
FIG. 7A
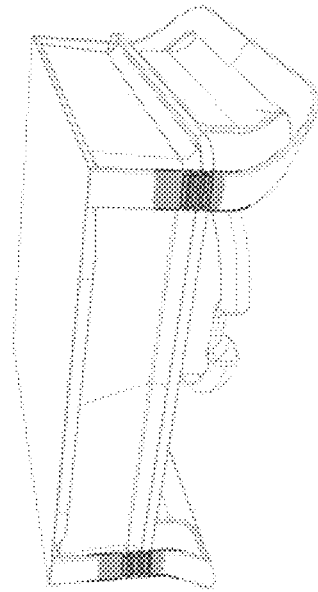
FIG. 7C
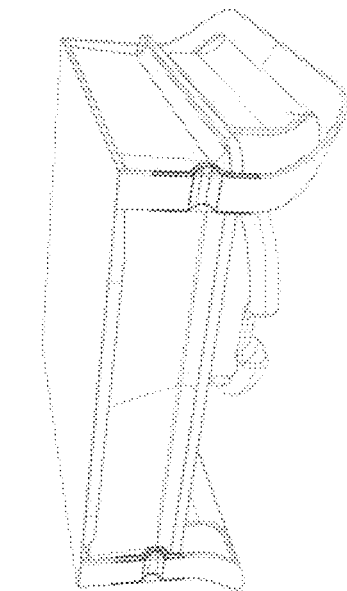
FIG. 7B

TECHNIQUES FOR RELEASING PARTS IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 63/214,884, filed Jun. 25, 2021, titled "Techniques for Releasing Parts in Additive Fabrication and Related Systems and Methods," which is hereby incorporated by reference in its entirety.

FIELD OF INVENTION

The present invention relates generally to systems and methods for releasing additively fabricated parts from a build platform in an additive fabrication device.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically, each layer is formed such that it adheres to either a previously formed layer or a build surface upon which the object is built.

In one approach to additive fabrication, known as stereolithography (SLA), solid objects are created by successively forming thin layers of a curable polymer resin, typically first onto a build surface and then one on top of another. Exposure to actinic radiation cures a thin layer of liquid resin, which causes it to harden and adhere to previously cured layers or the bottom surface of the build surface.

In another approach to additive fabrication, known as selective laser sintering (SLS), solid objects are produced from laser-fusible powder in a layer-wise fashion. During SLS, thin layers of powder are successively distributed across a build platform (e.g., through a powder roller). Laser energy is directed to a respective layer of powder to fuse, melt, or sinter selected regions of the laser-fusible powder to form a cross-section of a solid object. This process is repeated as additional layers of powder are distributed and the layer energy is used to fuse successive cross-sections of the solid object.

In another approach to additive fabrication, known as fused deposition modeling (FDM), filament-shaped material is heated and extruded through a nozzle, and positioned on a build platform or stacked on previously deposited materials accordingly to fabricate a three-dimensional object.

In another approach to additive fabrication, known as binder jetting, an ink jet head sprays a binder onto successive thin layers of powder, which, when cured, forms regions of power held together by the binder that represents a given cross-section of the object to be fabricated.

In another approach to additive fabrication, known as inkjet printing, an inkjet printing head nozzle sprays polymerizable compositions onto a build platform in consecutive layers. Each layer is cured and solidified using a suitable methodology (e.g., UV light) to form a given cross-section of the object to be fabricated.

SUMMARY

According to some aspects, a build platform configured to be removably attached to an additive fabrication device is provided, the build platform comprising a rigid structure, and an actuation structure coupled to the rigid structure and comprising one or more sheet handles and a flexible sheet, wherein the one or more sheet handles are attached to the flexible sheet, wherein a first surface of the flexible sheet forms a build surface on which the additive fabrication device is configured to form layers of material, and wherein the one or more sheet handles are configured to be actuated to deform at least a part of the flexible sheet away from the rigid structure.

According to some aspects, an additive fabrication device configured to form layers of material on a build surface is provided, the additive fabrication device comprising a build platform comprising a rigid structure, and an actuation structure coupled to the rigid structure and comprising one or more sheet handles and a flexible sheet, wherein the one or more sheet handles are attached to the flexible sheet, wherein a first surface of the flexible sheet forms a build surface on which the additive fabrication device is configured to form layers of material, and wherein the one or more sheet handles are configured to be actuated to deform at least a part of the flexible sheet away from the rigid structure.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 7A-7I illustrate exemplary dripping-prevention designs of an actuation structure, according to some embodiments.

DETAILED DESCRIPTION

Figure 1B:
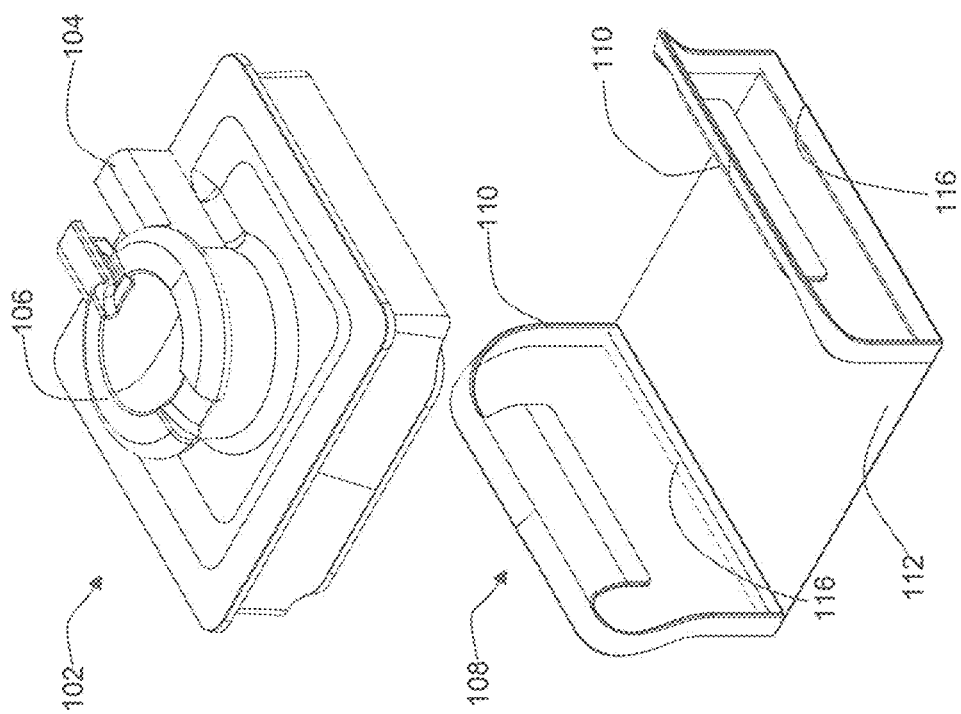
FIGS. 1A-1C illustrate an exemplary build platform in different configurations suitable for use in an additive fabrication device, according to some embodiments.

In additive fabrication, irrespective of the particular mechanism by which layers of material are formed, the material is usually formed on some kind of surface usually referred to as a "build surface." The build surface is typically the surface of a component of the additive fabrication device referred to as a "build platform." The build platform may, in some additive fabrication devices, be configured to move within the device so that material can be deposited at an appropriate position on the build surface. For instance, build platforms are frequently configured to move in a vertical direction between formation of each layer so that a new layer may be formed on top of a previously formed layer.

Typically, a first layer of material is formed on the build surface as an initial step of the formation process. The first layer may provide stability for subsequent formation of additional layers and/or may provide a layer through which a part being formed may be adhered to the build surface. The degree to which the first layer and the build surface adhere to one another may depend on multiple factors, such as the material used to form the layer, the material of the build surface, and the geometries of the build platform and/or the first layer. In some cases, the first layer of the part being fabricated may have an area that is sufficiently small that the adhesive forces between the first layer and the build surface during fabrication may be insufficient to retain contact between the part and build surface, which may lead to the part separating partially or completely from the build surface. Assuming the part successfully adheres to the build surface throughout the fabrication process, however, it is removed from the build surface as a post-processing step subsequent to fabrication of the part being completed.

In addition to removal of a part from a build surface, additional post-processing steps may be performed subsequent to fabrication of the part. In some use cases, support material may have been formed for the purpose of mechanically supporting overhanging or otherwise unsupported structures of the part during fabrication, and this excess material may be removed (e.g., using a knife or other cutting tool). In some use cases, cleaning of a part may be performed after fabrication. For example, when using a photopolymer-based additive fabrication device it may be beneficial to immerse a newly formed part into a cleaning solution such as isopropyl alcohol to remove excess uncured or partially cured resin from surfaces of the newly formed part. In some use cases, the surface of a fabricated part may be altered or finished using techniques that etch or otherwise affect the surface characteristics of the part. For example, parts fabricated using a fused filament additive fabrication technology may be finished using a vapor polishing technique (e.g., using acetone vapor) which causes the surface of the part to be smoothed and appear glossy. In some use cases, a part may be immersed in water and/or an acid/alkaline solution (e.g., sodium hydroxide) to dissolve a portion of the part.

Performing post-processing steps, including but not limited to those discussed above, may, however, risk damage to the fabricated part. In many cases, fabricated parts can be fragile and may include features that could be damaged and/or removed by certain post-processing steps. For example, a user removing a support structure from a part or cleaning a part may exert a sufficient force upon the part (e.g., through holding or otherwise) that the force causes the part to be damaged. In some cases, removing a part from a build surface to which it is adhered may cause damage to the part via the forces that are necessarily exerted on the part in order to remove it. In some extreme cases, the use of a scraping or cutting tool to remove a part from a build surface may result in injury to a user. For example, if the adhesive forces between a fabricated part and a build surface are sufficiently high, the user may have to exert considerable force in order to separate the part from the build surface, which increases the risk of injury.

As a result of these and other challenges with post-processing, it may be desirable to reduce adhesive forces between the part and the build platform during fabrication to make it easier to perform post-processing of parts after fabrication. However, such a reduction may cause a part to separate partially or fully from the build platform during fabrication, typically causing the fabrication process to fail. Consequently, conventional processes and devices retain high adhesive forces between the part and the build platform to ensure successful fabrication yet resulting in post-processing challenges such as the aforementioned examples.

The inventors have recognized and appreciated that removal of a part from a build surface may be performed using one or more removal mechanisms that, when actuated, deform the build surface thereby causing the part to separate from the build platform. The build surface may be, or may comprise, the surface of a flexible build layer that is fixed to the build platform in part whilst some portions of the flexible build layer may be free to move relative to a base portion of the build platform. For example, a build layer may be removably attached to a base of the build platform through magnetic force. The removal mechanism may include any mechanism that, when actuated, applies a force onto the build layer in a direction away from a base of the build platform to which the build layer is attached. The removal mechanism thereby causes the build layer (and thereby the build surface) to deform, which in turn may cause a part adhered to the build surface to separate from it.

According to some embodiments, a removal mechanism may comprise one or more elements that can be moved relative to (e.g., towards and away from) the build surface, such that actuating the mechanism causes the one or more elements to push at least a portion of the build surface away from the base to which the build surface is attached. Actuation of the mechanism may be manual, such as via a handle that can be pushed by a user holding the build platform, and/or may be automatic, such as via one or more motors that operate to move the elements to push the build surface.

According to some embodiments, a build platform may include one or more mechanisms, in addition to the removal mechanism(s), that apply a restorative force to the build layer. Since a flat build surface is desirable for fabrication, such a restorative mechanism may act to return the build surface to a flat state after the removal mechanism is used to deform the build surface to remove a part. An illustrative use case for a build platform so configured may, therefore, comprise acts of fabricating a part on a flat build surface of a build platform, actuating a removal mechanism to deform the build layer and thereby separate the part from the build platform, then manipulating the removal mechanism such that its force upon the build layer is sufficiently reduced that a restorative mechanism can act to return the build surface to a flat state. A restorative mechanism therefore includes any elements of the build platform that act to apply a force onto the build layer to return the build surface to a flat state.

In some embodiments, as an alternative to a restorative mechanism, the build layer may be formed from material that naturally returns to a flat state when the removal mechanism is suitable actuated away from the build surface. For example, the build layer may comprise a rigid material that buckles when force is applied to it by the removal mechanism, but that flexes back to its original state when the removal mechanism stops applying such a force.

According to some embodiments, a build platform of an additive fabrication device may be removable from the device. In some cases, the build platform containing one or more removal mechanisms may be configured to be attached to portions of the additive fabrication device during fabrication and then removed from the device after fabrication. Separation of a part from the build platform may therefore, in at least some cases, occur when the build platform is separated from the additive fabrication device.

A build platform configured to be removably attached to an additive fabrication device may, in some embodiments, comprise a rigid structure, an actuation structure attached to the rigid structure, wherein the actuation structure comprises one or more sheet handles and a flexible sheet. For example, the flexible sheet may comprise one or more magnetic materials (e.g., ferromagnetic materials such as iron, steel, stainless steel, etc.). In another example, the flexible sheet may be made be of non-magnetic materials but include magnetic materials such as magnetic tape attached to it.

In some embodiments, the actuation structure may include two sheet handles attached to opposite sides of a flexible sheet. In some embodiments, the sheet handles and the flexible sheet are separate components and are joined together through fastening means such as nuts and bolts, pins and rivets, welding, glue, crimps, snap-fits, shrink-fits, etc. Alternatively, the sheet handles and the flexible sheet are an integrated part and are manufactured from the same material, and wherein a first surface of the flexible sheet forms a build surface on which the additive fabrication device is configured to form layers of materials, and the one or more sheet handles are configured to be actuated (e.g., either manually by a user or through motorized means) to apply a force to the flexible sheet, to deform at least a part of the flexible sheet away from the rigid structure.

In some embodiment, during the actuation of the one or more sheet handles, part of the flexible sheet (e.g., the central portion) experiences an elastic force (e.g., due to the "squeezing" of the sheet handles) that is greater than the magnetic force exerted on it by the rigid structure. As a result, the part of the flexible sheet deforms and bends away from the rigid structure. At the same time, other parts of the flexible sheet (e.g., edges of the flexible sheet where the sheet handles are attached) experience an elastic force that is smaller than the magnetic force exerted by the rigid structure (or the magnetic force plus normal force due to the edge parts of the flexible sheet resting in troughs of the rigid structure). In some embodiments, the magnetic materials placed along the edge of the rigid structure (the edges where the sheet handles are attached to the flexible sheet) exert greater magnetic force than the magnetic materials placed in the center region of the rigid structure).

In some embodiments, the actuation structure is attached to the rigid structure through magnetic force.

In some embodiments, a second surface of the flexible sheet is configured to be attached to a first surface of the rigid structure, and wherein the first surface of the rigid structure includes: a first magnetic zone exerting a first amount of magnetic force per area on the actuation structure, and a second magnetic zone exerting a second mount of magnetic force per area on the actuation structure; and wherein the first amount is different from the second amount.

In some embodiments, the one or more sheet handles include two sheet handles respectively attached to the flexible sheet at opposite sides of the flexible sheet.

In some embodiments, the rigid structure includes a mounting device (e.g., top handle and a "dovetail") configured to be attached to the additive fabrication device.

In some embodiments, the one or more sheet handles each comprises a drip-prevention structure to prevent liquid on the flexible sheet from dripping down the sheet handles. The dripping resin occurs when the build platform is oriented such that the flexible sheet is above the rigid structure and the sheet handles.

In some embodiments, the build platform is configured to be removed from the additive fabrication device and to be attached to a positional tool (e.g., a jig) for the actuation of the one or more sheet handles.

In some embodiments, the orientation of the positional tool is adjustable. In some embodiments, the positional tool can be oriented such that the build platform is attached to the positional tool at an angle. As a result, after the actuation of one or more sheet handles, the fabricated parts slide down the flexible sheet due to gravity.

In some embodiments, the rigid structure includes troughs at the edges and parts of the one or more sheet handles rest in the troughs. The troughs act as a locating feature for the build surface, an area where additional magnetic force can be applied to aid in adhesion of the actuation structure to the rigid structure towards the edges of the build platform, and a place for the surface rods to pivot for the cam feature.

In some embodiments, during actuation of the one or more handles to apply a force to the flexible sheet, during a first phase of the actuation, an elastic force experienced by a first part (e.g., the center portion) of the flexible sheet is smaller than the magnetic force exerted on the first part of the flexible sheet (as a result, the flexible sheet stays in contact with the rigid structure); during a second phase of the actuation, the elastic force experienced by the first part of the flexible sheet is greater than the magnetic force exerted on the first part of the flexible sheet (thereby causing the first part of the flexible sheet to move away from the rigid structure).

In some embodiments, the one or more sheet handles are configured to be actuated while at least a part of the actuation structure remains attached to the rigid structure.

In some embodiments, the actuation structure is attached to the rigid structure through mechanical retaining means.

Following below are more detailed descriptions of various concepts related to, and embodiments of, techniques for separating an additively fabricated part from a build surface. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein. In particular, while the following describes embodiments in which removal mechanisms and/or restorative mechanisms may be located within a build platform, it may be appreciated that one or more components of such mechanisms may be located within an additive fabrication device in proximity to the build platform and the same results achieved so long as the appropriate forces, described below, can be directed to the build surface.

Figure 1A:
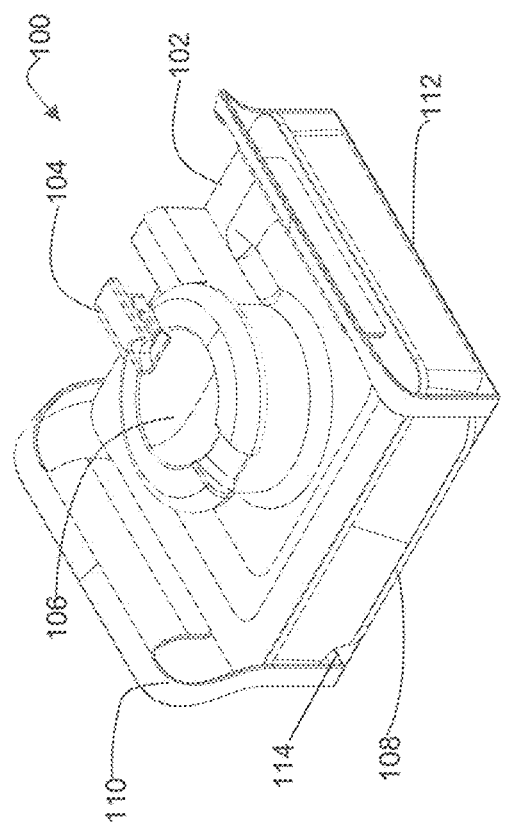
Figure 1C:
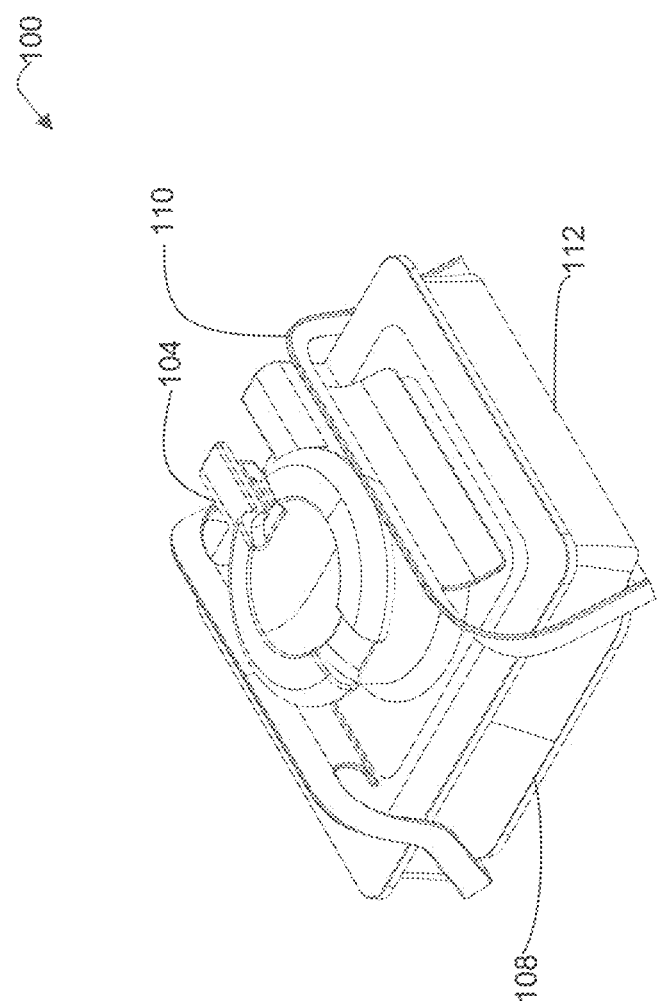

FIGS. 1A-1C illustrate an exemplary build platform 100 in different configurations suitable for use in an additive fabrication device, according to some embodiments. For example, the build platform 100 may be suitable for use in a stereolithography (SLA) additive fabrication device as described in FIGS. 8A-8B, or for use in a selective laser sintering (SLS) additive fabrication device as described in FIG. 9. At a high level, the build platform 100 includes two parts: a rigid structure 102, which comprises a top handle 106 and a mounting attachment 104; and an actuation structure 108, which comprises a flexible sheet 112 and sheet handles 110. The actuation structure can be removably attached to the rigid structure as described further below. FIG. 1A depicts the actuation structure attached to the rigid structure, whereas FIG. 1B depicts the actuation structure separately from the rigid structure. FIG. 1C depicts the depicts the actuation structure attached to the rigid structure with the actuation structure having been actuated to deform the flexible sheet of the actuation structure.

FIG. 1A illustrates the build platform 100 in an initial configuration wherein a rigid structure 102 is attached to an actuation structure 108. In this configuration, a flexible sheet 112 of the actuation structure 108 sits substantially flush against the bottom surface of the rigid structure 102, and sheet handles 110 of the actuation structure abut opposite sides of rigid structure 102. As will be described in more detail below, in some embodiments, the flexible sheet 112 may be attached to the bottom surface of rigid structure 102 by various techniques, which may include magnetic forces between the sheet and the structure. The bottom surface of the flexible sheet may be referred to herein as the "build surface" of the build platform 100, being a surface on which layers of materials will be successively placed during fabrication of parts. The bottom surface of the rigid structure 102 includes troughs 114 of predetermined curvature at opposite edges to engage with handle rods 116 of the sheet handles, as the flexible sheet 112 sits flush against the bottom surface of the rigid structure 102. The build platform 100 may be placed in post-processing devices such as a wash station or a curing station, or be mounted on a mount (e.g., a jig) for fabricated parts removal using the mounting attachment 104.

FIG. 1B illustrates a second configuration of the build platform 100 where the rigid structure 102 is detached from the actuation structure 108. This configuration may occur, for example, when a user detaches the actuation structure 108 from the rigid structure 102 for cleaning or maintenance. In some embodiments, to minimize downtime of an additive fabrication device, the user may swap the actuation structure 108, having fabricated parts on the build surface after a fabrication process has completed, with another actuation structure 108 having a clean build surface.

FIG. 1C illustrates a third configuration of build platform 100 where the sheet handles 110 of the actuation structure 108 have been actuated to apply a force to the flexible sheet 112, causing the sheet to deform. The deformation of the flexible sheet 112 may allow fabricated parts attached to the flexible sheet 112 (parts not shown in FIG. 1C) to be more easily peeled off the build surface than would be possible from a rigid, planar build platform.

In the example of FIG. 1C, the build platform 100 may comprise one or more restorative mechanisms configured to apply a force to restore the actuation structure 108 to its original configuration as shown in FIG. 1A (that is, with the flexible sheet being flat, or substantially flat, against the bottom surface of the rigid structure 102). In some embodiments, the restorative mechanism may be configured so that the force applied to the actuation structure is sufficiently large when the sheet handles are positioned in the actuated position as shown in FIG. 1C to move the actuation structure 108 back against the rigid structure (so long as the user applies a force onto the handles that is lower than the force applied by the restorative mechanism). For example, the restorative mechanism may be configured so that once the user lets go of the handles, the actuation structure 108 will be pulled back onto the rigid structure. In some embodiments, the restorative mechanism may be configured so that the force applied to the actuation structure is only large enough to pull the actuation structure 108 back against the rigid structure when the actuation structure is moved partially back toward the rigid structure by the user moving the handles back to their original position shown in FIG. 1A. For example, the restorative mechanism may be configured so that once the user begins to move the handles back to their original position, the force applied by the restorative mechanism pulls the actuation structure onto the rigid structure. In either case, once the actuation structure is pulled back to the rigid structure, the restorative mechanism may be configured to maintain the actuation structure in that position until a sufficiently high force is applied by the sheet handles 110 to overcome the force of the restorative mechanism.

As will be described in more detail below, during actuation of the actuation structure, at least part of the sheet handles 110 (e.g., the handle rods) are slidingly attached to the troughs 114 of the rigid structure 102, as a central portion of the flexible sheet 112 begins to separate from the bottom surface of the rigid structure 102. As a result, during actuation, each of the sheet handles 110 pivots towards the top handle 106 around the troughs 114. In some embodiments, the top handle 106 limits the maximum distance sheet handles 110 can travel.

In some embodiments, the flexible sheet 112 is formed from one or more materials such that the build surface (e.g., the bottom surface of the flexible sheet 112) is flexible or otherwise deformable. In some embodiments, the flexible sheet 112 may comprise a ferromagnetic layer, such as spring steel. In some embodiments, additional layers may be added to such a ferromagnetic layer. For example, protective coatings and/or other materials may be disposed upon the ferromagnetic layer that modify forces of adhesion between the build surface and material formed on the build surface.

In some embodiments, when the actuation structure 108 is attached to the build platform, the flexible sheet 112 may be attached to rigid structure 102 at one or more locations so long as at least some of the build layer is free to move or deform such that the build surface changes shape. In some embodiments, the flexible sheet 112 may be removably attached to the bottom surface of rigid structure 102. For instance, rigid structure 102 may include a magnetic element of sufficient strength embedded below the bottom surface to hold flexible sheet 12 in place during fabrication whilst allowing a user to separate the build layer from the rigid body via application of force on the sheet handles 110.

In some embodiments, the restorative mechanism applies a force to the flexible sheet 112 to cause the flexible sheet 112 to adopt a substantially conformal shape when the actuation structure 108 is attached to the rigid structure 102. In some cases, such a shape may result in the build surface being flat against the rigid structure 102 as seen in FIG. 1A.

For example, the restorative mechanism may include the restoring elastic force of the flexible sheet 112, or magnets embedded in the bottom surface of the rigid structure 102 that attract the flexible sheet 112. In some embodiments, restorative forces applied by the restorative mechanism may be applied across any portion of the build surface, such as the entire surface or only a portion of the build surface on which material is expected to be formed during additive fabrication. In some embodiments, the restorative mechanism may comprise a single restorative force producing element (e.g., a single magnet) or may comprise multiple restorative force producing elements that each produce restorative forces, which need not necessarily be of the same magnitude nor produced by the same means (e.g., the restorative mechanism may comprise any number of magnets and/or springs coupled to the build layer).

In some embodiments, the restorative mechanism may include components in both the rigid structure 102 and the actuation structure 108. For instance, in some cases the rigid structure 102 and the actuation structure 108 may each include one or more magnets, such that the magnets have an attractive force that pulls the rigid structure 102 and the actuation structure 108 towards one another.

Irrespective of how the restorative mechanism applies force to the build surface, according to some embodiments, the restorative mechanism may apply force to the build surface such that there is no substantial deformation of the build surface away from the rigid body during additive fabrication process. That is, forces applied by the restorative mechanism to the build surface may be sufficiently high to overcome forces applied to the build surface in an opposing direction during fabrication (e.g., the downward force experienced by the build surface resulting from pulling a fabricated part from liquid resin).

In some embodiments, the flexible sheet 112 may be attracted and/or attached to the rigid structure 102 by restorative mechanism using any number of techniques, including magnetic, vacuum, adhesive and/or mechanical forces. In some embodiments in which a build surface comprises one or more ferromagnetic materials, a restorative mechanism may preferably comprise one or more magnets, such as one or more sheet magnets.

In some embodiments, actuation of the sheet handles 110 may result in a progressive "peeling" of the flexible sheet 112 away from the rigid structure 102 that begins at the center of the flexible sheet 112 and progresses across the rigid body towards edges of the flexible sheet 112. This progressing peeling may tend to cause the build layer to adopt a bend at the propagating separation boundary, thereby potentially separating a part from the build layer.

Figure 2A:
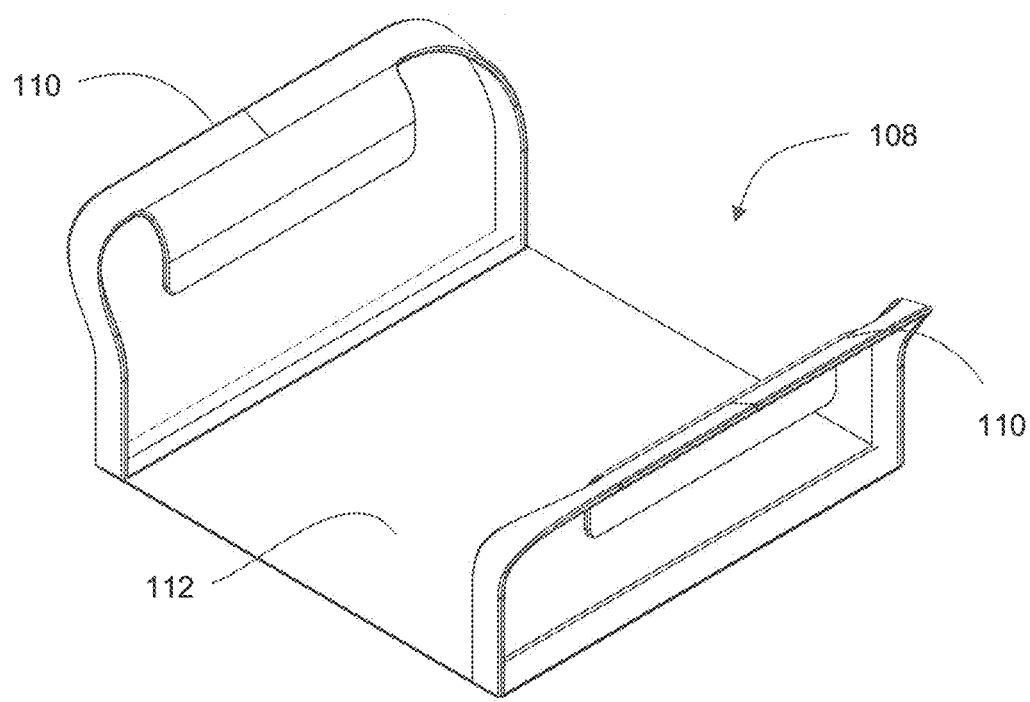
FIGS. 2A-2C illustrate components of an exemplary actuation structure of the build platform, according to some embodiments.
Figure 2B:
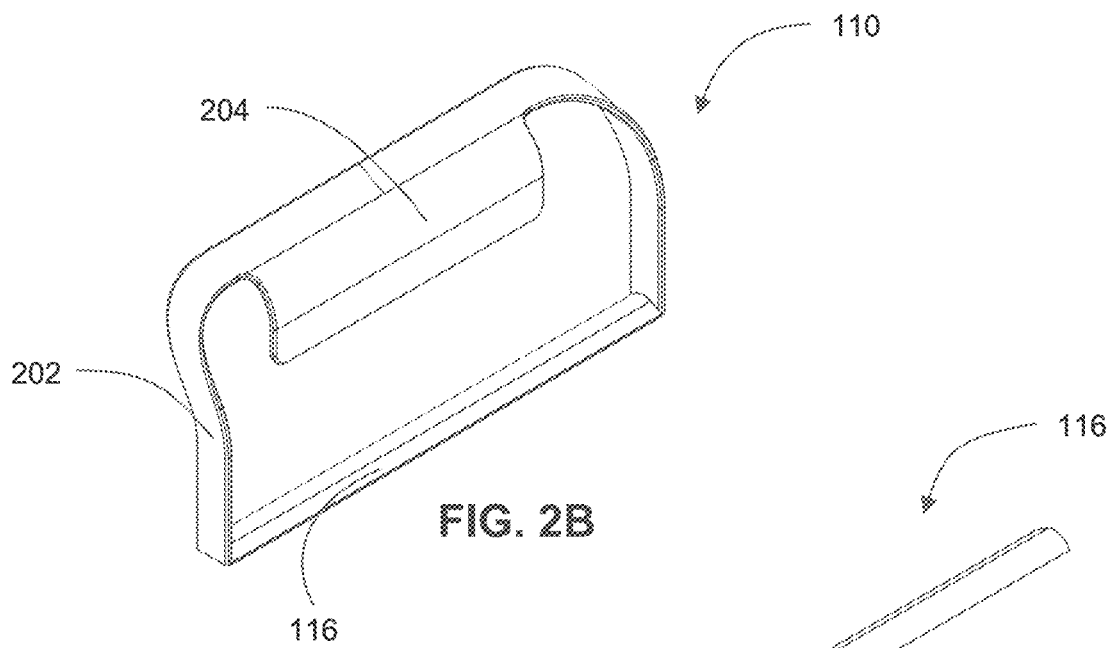
Figure 2C:
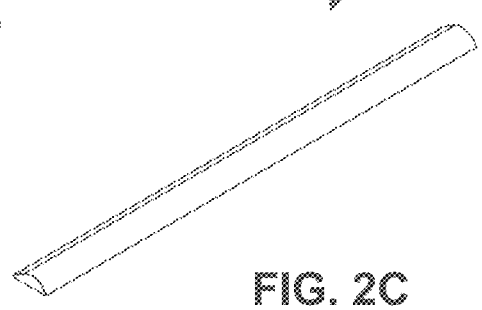

FIGS. 2A-2C illustrate components of the actuation structure 108 of the build platform 100 suitable for use in an additive fabrication device, according to some embodiments. In the example of FIGS. 2A-2C, the actuation structure 108 is configured to deform (e.g., flex at the flexible sheet 112) through the application of force at the sheet handles 110 while the actuation structure 108 is attached to the rigid structure 102 (FIGS. 1A-1C), or as a stand-alone device. The actuation structure 108 includes the flexible sheet 112 fixedly attached to the sheet handles 110 at opposite edges. In some embodiments, the flexible sheet 112 may be comprise, or may consist of, one or more ferromagnetic materials or may be coated in one or more ferromagnetic materials. In some embodiments, the flexible sheet 112 may be formed of a sufficiently rigid material that the material exerts a restorative force when the sheet is deformed. In some embodiments, the flexible sheet 112 has a shape and size substantially similar to that of the bottom surface of rigid structure 102, and can be attached to rigid structure 102 through magnetic attraction (e.g., the rigid structure 102 includes one or more magnets on or below its bottom surface). In some embodiments, the sheet handles 110 are joined to flexible sheet 112 at the bottom of the handles by welding, glue, fasteners, or other means (e.g., the handle rods 116 are attached to the flexible sheet 112).

FIG. 2B illustrates the sheet handle 110 of the actuation structure 108. In some embodiments, the sheet handle 110 is attached to the flexible sheet 112 along an edge of the flexible sheet 112. The sheet handle 110 includes a handle frame 202, a handle rod 116, and a handle body 204. In some embodiments, the handle rod 116 is attached to the handle frame 202 by welding, glue, fasteners, or other means. The handle rod 116 may comprise, or may consist of, one or more ferromagnetic materials or may be coated in one or more ferromagnetic materials.

FIG. 2C shows a detailed view of the handle rod 116. In some embodiments, the handle rod 116 has a flat bottom surface and a rounded top surface. As a result, the cross-section of the handle rod 116 resembles a segment of a circle. In some embodiments, the rounded top surface makes sliding contacts with the trough 114 of the rigid structure 102 (FIGS. 1A-1C) during the actuation of the actuation structure 118, thereby enables the sheet handle 110 to pivot around the handle rod 116. As will be described in more detail below (e.g., FIG. 4), in some embodiments, magnets are embedded in the rigid structure above the troughs 114 to attract the handle rods 116 to the troughs of the rigid structure 102.

Figure 3A:
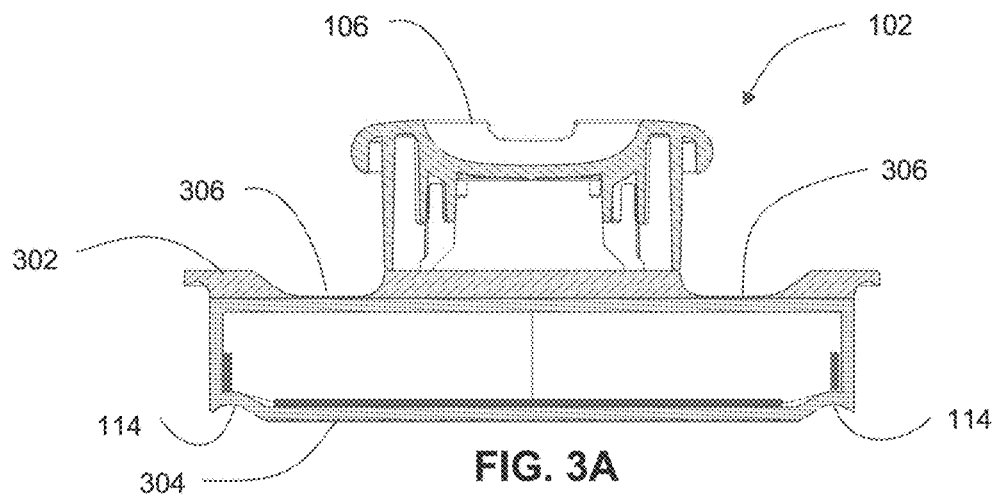
FIGS. 3A-3C illustrate an exemplary rigid structure of the build platform in different perspectives, according to some embodiments.
Figure 3B:
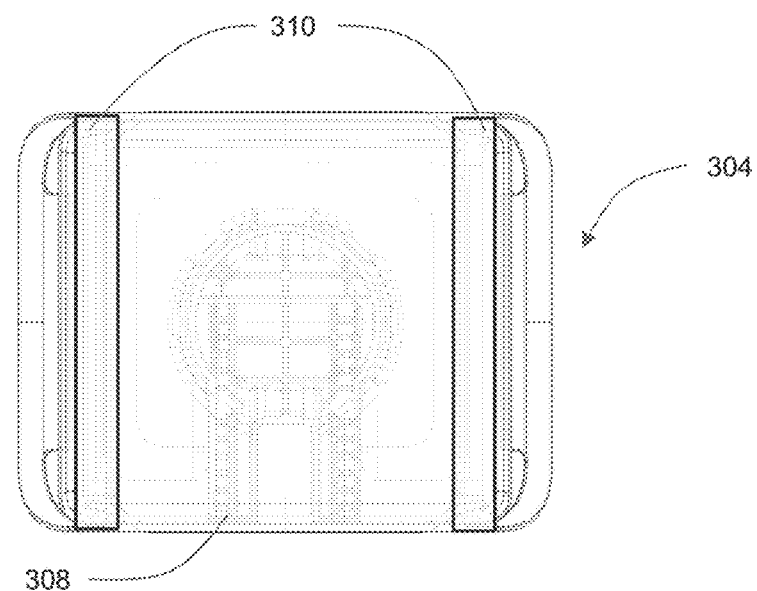
Figure 3C:
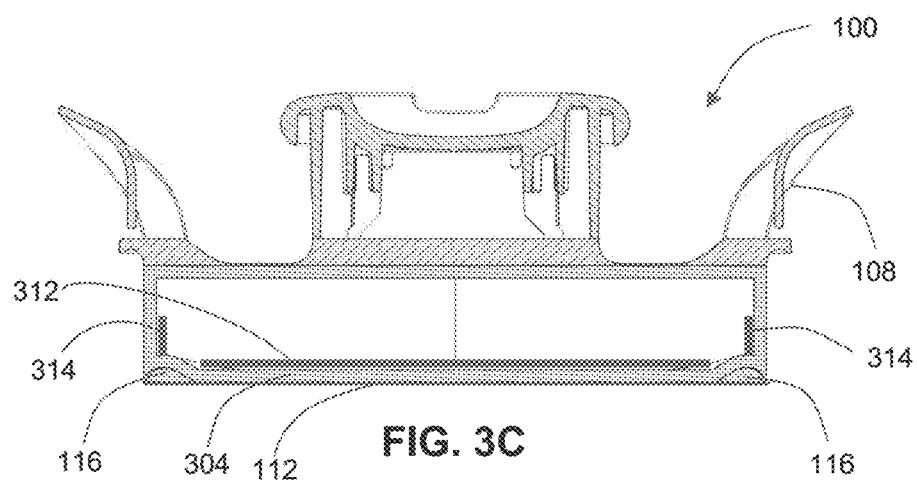

FIGS. 3A-3C illustrate the rigid structure 102 of build platform 100 in different perspectives, according to some embodiments.

FIG. 3A shows a cross-sectional view of the rigid structure 102, according to some embodiments. In the example of FIG. 3A, the rigid structure 102 includes a top surface 302 and a bottom surface 304. The top handle 106 (e.g., as shown in FIG. 1A) is attached to the top surface 302 at a center portion. In some embodiments, recess regions 306 (also known as "cams") are formed within the top surface 302 and positioned on either side of the top handle 106. As will be described in more detail below, the recess regions 306 may serve as guides for the sheet handles 110 during actuation ("actuation" is defined as causing the one or both sheet handles 110 to move (e.g., rotating, bending and/or moving laterally) towards the top handle 106, such as by pushing the sheet handles 110 manually or by motorized means), wherein during actuation the sheet handles make contact with the recess region 306. As a result of this guided motion, the actuation structure 108 may maintain contact with the rigid structure 102 during the actuation.

In the example of FIGS. 3A-3C, the bottom surface 304 of the rigid structure 102 includes a substantially flat center portion for attaching to the flexible sheet 112. The bottom surface 304 also includes troughs 114 arranged at opposing sides of the rigid structure that engage with the handle rods 116. The troughs 114 may be formed with any suitable cross-sectional shape that limits the movement of the handle rods 116 during at least part of actuation. For example, the troughs 114 may include a curved surface, a delta-gap shaped surface, a slanted surface, etc. In some embodiments, the troughs 114 may be configured to have a cross-sectional shape that matches the cross-sectional shape of the handle rods, so in at least one position the handle rods can sit fully within the troughs. During actuation, the handle rods may rotate or otherwise move within the troughs, with the trough and handle rods' cross-sectional shapes dictating the motion of the flexible sheet that results from the motion of the handle rod against the trough.

As will be described in more detail in FIGS. 5A-5D, during actuation of the actuation structure 108, the sheet handles 110 may travel towards each other by sliding along the recess regions 306, and during this time the handle rods 116 may stay within or substantially within the troughs 114 to allow the flexible sheet 112 to deform. In some embodiments, the recess regions 306 have a shape and depth that correspond to the geometry of the sheet handles 110 such that during actuation, the handle rods 116 are able to stay within or substantially within the troughs 114.

FIG. 3B shows a bottom view of the bottom surface 304 of the rigid structure 102, according to some embodiments. In the example of FIG. 3B, the view is a partially transparent one with features of the rigid structure other than the bottom surface 304 shown in light gray to depict their position for purposes of illustration. Though, it will be appreciated that these features may not be visible from the bottom of the rigid structure in practice.

In the example of FIG. 3B, the bottom surface 304 includes at least two types of magnetic zones: a face magnetic zone 308 in the center of the bottom surface 304 exerting a first amount of magnetic force per unit area towards the center portion of the flexible sheet 112, and edge magnetic zones 310 along the edges (e.g., the edges where the sheet handles 110 are located) exerting a second amount of magnetic force per unit area towards the edge portions (e.g., the handle rods 116) of the flexible sheet 112. In some embodiments, the second amount is greater than the first amount, so that the edges apply a greater magnetic force by unit area than does the center portion.

As a result of the magnetic zones applying a different magnitude of magnetic force, during actuation the flexible sheet 112 may separate (e.g., peel off the rigid structure 102) from the bottom surface 304 of the rigid structure 102 in a progressive manner. For example, the center portion of the flexible sheet may first separate from the bottom surface, then as the actuation continues and the force applied to the flexible sheet increases, the flexible sheet 112 and the bottom surface 304 separate from the edges of the rigid structure. In some embodiments, during actuation, due to the troughs 114 engaging with the handle rods 116, the recess regions 306 engaging with the sheet handles 110, and the top handle 106 serving as a stopper, the actuation structure 108 stays on the rigid structure 102 throughout the duration of the actuation.

FIG. 3C is a cross-sectional view of the rigid structure, showing an illustrative placement of magnets within the structure, according to some embodiments. In the example of FIG. 3C, an arranged group of individual magnets (e.g., an N×N array of magnets) and/or a sheet magnet 312 is located within the rigid structure and above the bottom surface 304 to create the face magnetic zone 308 discussed above in relation to FIG. 3B. One or more magnets 314 may be arranged within or adjacent to the trough 114 to create each edge magnetic zone 310. In some embodiments, the magnets are heat sealed within the rigid structure 102.

Figure 4:
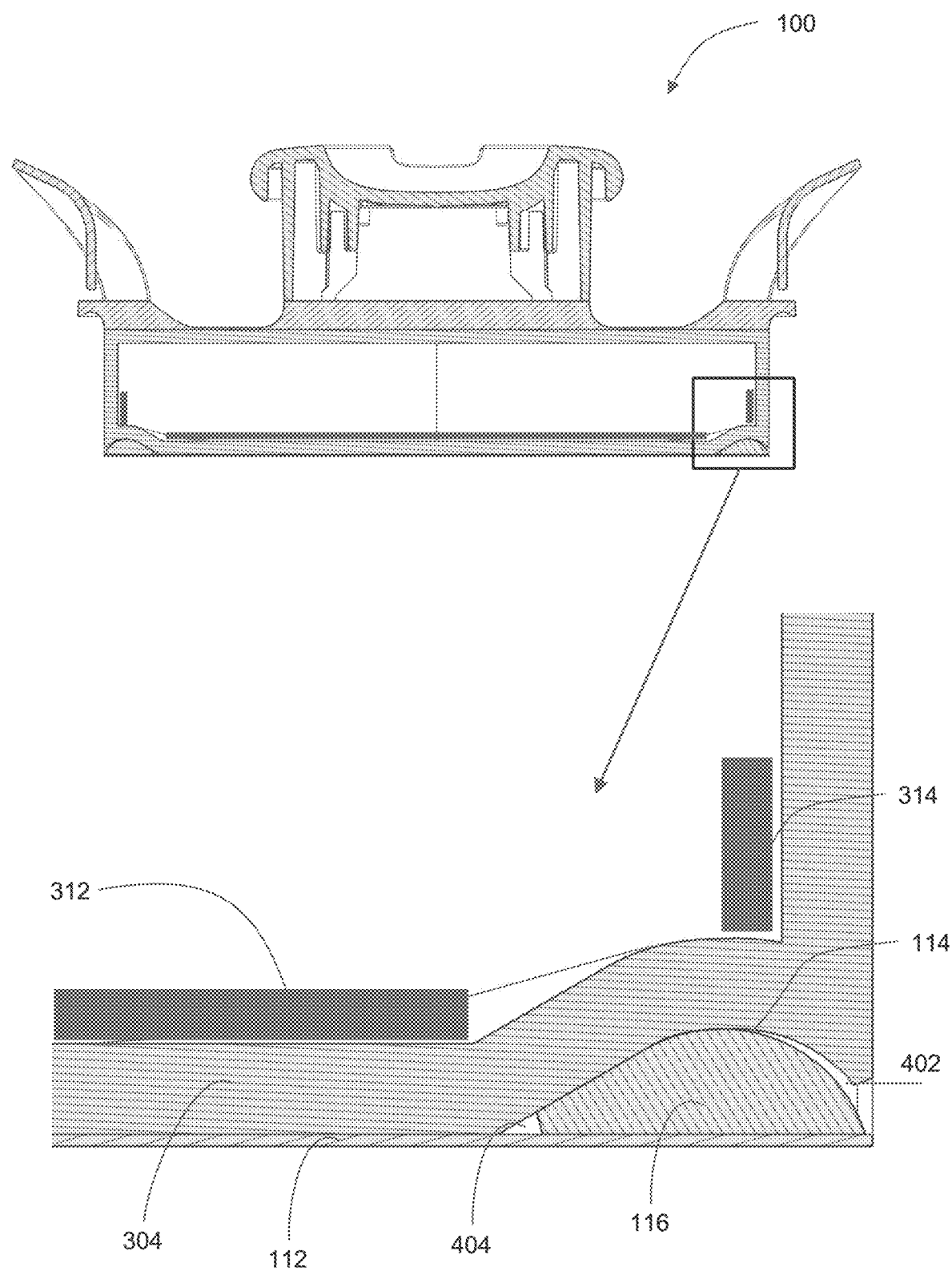
FIG. 4 illustrates an exemplary trough design on a rigid structure that engages with handle rods of an actuation structure, according to some embodiments.

FIG. 4 illustrates an exemplary design of the trough 114 on the rigid structure 102, according to some embodiments. The top surface of the handle rods 116 and the troughs 114 have corresponding shape to allow engagement. As shown in FIG. 4, each handle rod 116 has a curved top surface that engages with the trough 114, which has a corresponding curved surface. As the handle rod 116 sits within the trough 114, the flexible sheet 112 also sits flush against the center portion of the bottom surface 304 of the rigid structure 102.

In some embodiments, the trough 114 is slightly larger than the handle rod 116, resulting in gap 402 and gap 404 between the handle rod and the trough. In at least some cases, the gap 404 may allow for misalignment between the trough 114 and the handle rod 116. In at least some cases, the gap 402 may allow the handle rod 116 to move towards the walls of the rigid structure during actuation. As an alternative to the illustrative cross-sectional shape shown in FIG. 4, the handle rod 116 may instead have a flat top surface (e.g., rectangular cross-section view) or a slanted top surface (e.g., triangular cross-section view). In such cases, the troughs 114 may have a corresponding shape (e.g., delta-gap or slanted).

In the example of FIG. 4, as the sheet handle 110 actuates, the flexible sheet 112 flexes away from the bottom surface 304 of the rigid structure 102. The handle rod 116 shown in FIG. 4 turns counterclockwise (whereas the other handle rod 116 on the other side of the flexible sheet 112 will turn in the opposite direction) and moves towards the gap 404. More discussion on the movement of the sheet handles 110 during actuation is described below with respect to FIGS. 5A-5D.

FIGS. 5A-5D illustrate an exemplary process in which the actuation structure 108 actuates to release fabricated parts from the build platform 100, according to some embodiments.

Figure 5A:
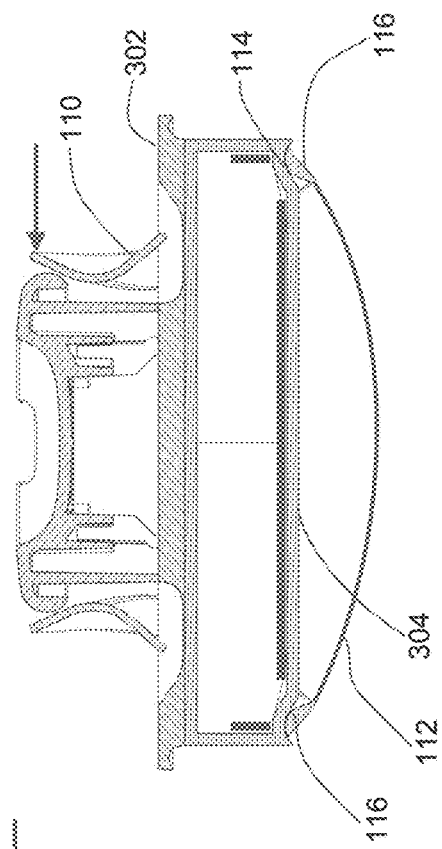
FIGS. 5A-5D illustrate an exemplary process in which an actuation structure actuates to release fabricated parts from a build platform, according to some embodiments.
Figure 6:
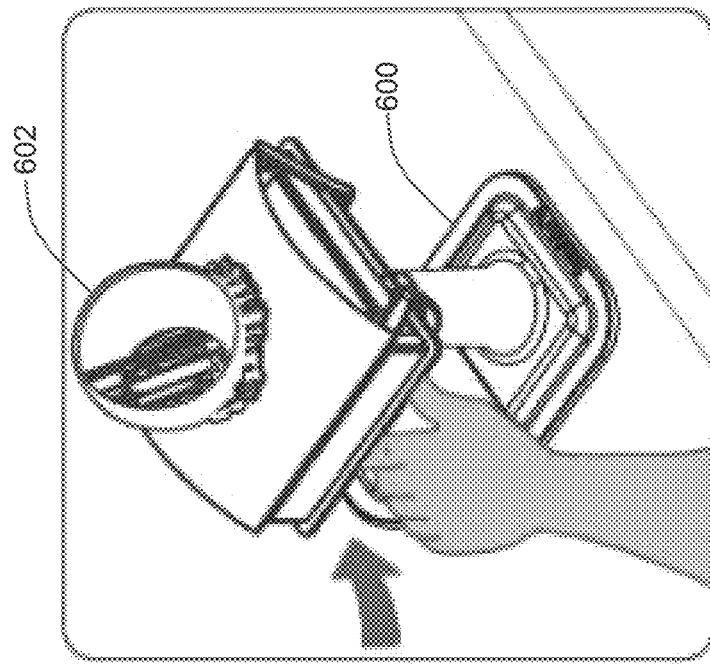
FIG. 6 illustrates an exemplary mount on which a built platform is mounted to remove fabricated parts from the build platform, according to some embodiments.
Figure 6:
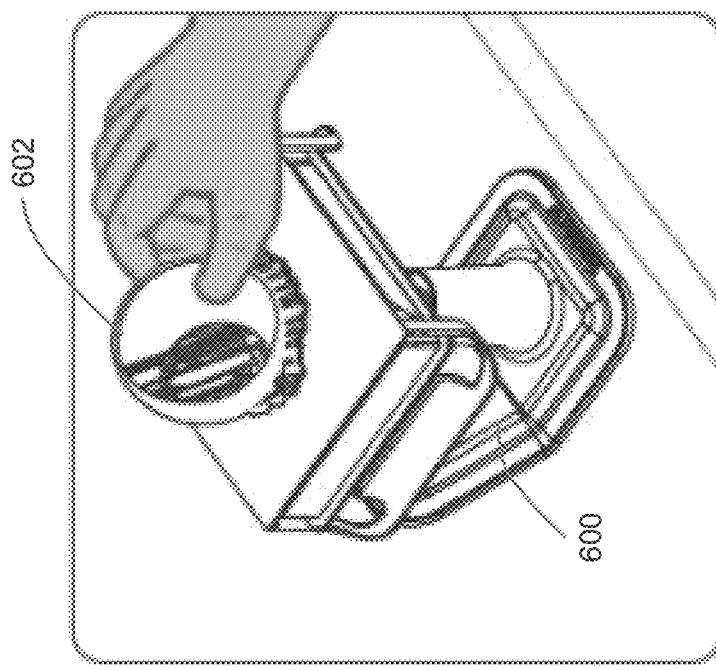

In FIG. 5A, rigid structure 102 is attached to the actuation structure 108 (e.g., via magnetic attraction between the flexible sheet 112 and magnets within the rigid structure), with the flexible sheet 112 sits flush against the bottom surface 304 of the rigid structure 102. The sheet handles 110 abut either side of the rigid structure 102. To actuate the sheet handles, a force is exerted on one or both sheet handles 110 towards the top handle 106. For example, a user may apply the force single-handedly by holding on the top handle 106 with fingers and pushing the sheet handle 110 towards the top handle 106 with the user's palm or thumb. In another example, the user may hold the build platform 110 by grabbing both sheet handles 110 with two hands, and squeeze the sheet handles 110. In another example, the build platform 100 may be mounted on a device (e.g., the mount shown in FIG. 6, a washing station, a curing station, or an additive fabrication device) using the mounting attachment 104 (FIG. 1A) for a user to apply the force. In another example, instead of manually operating the actuation structure 108, the user may rely on a motorized device to push one or both of the sheet handles 110.

Figure 5B:
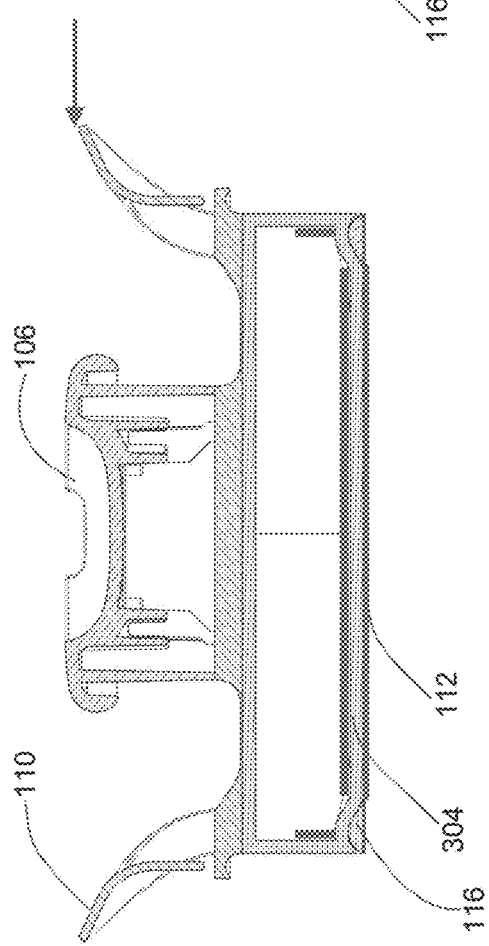
Figure 5C:
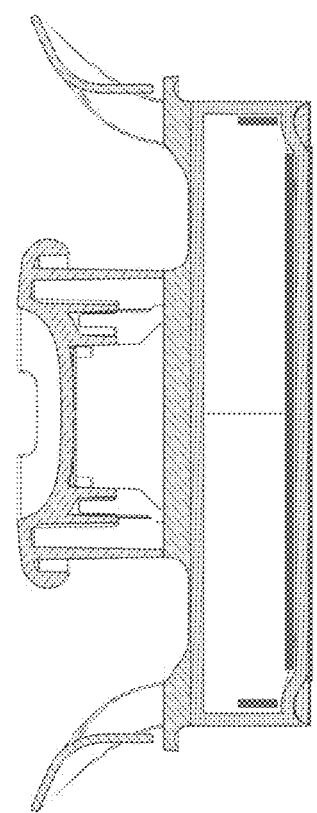

FIG. 5B shows the actuation structure 108 during actuation, as the user or a motorized device pushes at least one of the sheet handles 110 towards the top handle 106. When the actuation first starts, the flexible sheet 112 of the actuation structure 108 may be subjected to one or more forces, which may include any one or more of: (1) a separation force due to the actuation of the sheet handle 110 that pushes the flexible sheet 112 away from the bottom surface 304 of the rigid structure 102; (2) an elastic restoring force that tends to flatten the flexible sheet 112, which in turn pushes the flexible sheet 112 towards the bottom surface 304 to stay flat; (3) a first magnetic force exerted on a central portion of the flexible sheet 112 from the face magnetic zone 308 (FIG. 3B) of the rigid structure 102, which pushes the flexible sheet 112 towards the bottom surface 304; (4) a second magnetic force exerted on edge portions of the flexible sheet 112 by the edge magnetic zone 310 (FIG. 3B) that pushes the flexible sheet towards the bottom surface 304, and (5) a normal force exerted on the handle rods 116 by the troughs 114, that limits the movement of the handle rods 116 to substantially within the troughs 114.

At a first point in time during the actuation, the sheet handles 110 travel a first distance and the separation force may be weak compared to the attraction force. As a result, the flexible sheet 112 may stay flat on the bottom surface 304.

At a second point in time during the actuation, the sheet handles 110 travel a second distance (e.g., greater than the first distance) and the separation force causes a center portion of the flexible sheet 112 to separate from the bottom surface 304.

At a third point in time during the actuation, the sheet handles 110 travel a third distance (e.g., greater than the second distance, or all the way to come into contact with the top handle 106 as the maximum distance allowed), which causes the separation between the flexible sheet 112 and the bottom surface 304 to progress towards the edges (e.g., peeling). As a result, the separation between the flexible sheet 112 and the bottom surface 304 become larger.

According to some embodiments, during the actuation of the sheet handles 110 the sheet handles may make sliding contact with the recess region 306 on the top surface 302 of the rigid structure 102. The handle rods 116 stay engaged with the troughs 114 and are limited to move within the troughs 114. As a result, the actuation structure 108 stays on the rigid structure 102 throughout the actuation.

Figure 5D:
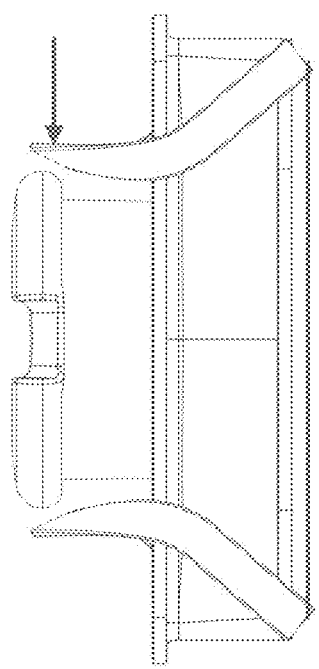

FIG. 5D shows that, in some embodiments, after the application of force ceases, the group of attraction forces causes the flexible sheet 112 to restore to its original configuration and returns to sitting flush against the bottom surface 304 of the rigid structure 102.

FIGS. 6A-6B illustrate an exemplary mount 600 (also known as a "jig") on which the build platform 100 can be mounted for removing fabricated parts 602. For example, the mount 600 can be secured at one end to a surface (e.g., tabletop), and attaches to the build platform 100 at the mounting attachment 104 (FIG. 1A). In some embodiments, the mount 600 can be adjusted to orient at different angles. For example, the mount 600 can be oriented such that the build platform 100 is facing upward (as shown in FIGS. 6A-6B), or is facing at an angle. The actuation of the build surface (e.g., as described in FIGS. 5A-5D) allows the flexible sheet 112 to deform and release fabricated parts stuck on the flexible sheet 112.

FIGS. 7A-7I illustrate exemplary dripping-prevention structures 700 on the sheet handles 110, according to some embodiments. When the build platform 100 is removed from the additive fabrication device (e.g., the additive fabrication device in FIGS. 8A-8B) after a fabrication session, uncured liquid resin may remain on the flexible sheet 112 or on the fabricated parts (not shown in FIGS. 7A-7D). The uncured liquid resin may drip down the sheet handles 110 when a user operates the build platform 100, causing chemical hazard risks to the user. Each of the illustrative dripping-prevention structures 700 shown in FIGS. 7A-7I are structures that catch or otherwise break the flow path of uncured liquid resin dripping from the flexible sheet 112 to inhibit the liquid from spilling from the build platform and/or from reaching the handle of the build platform.

In the example of FIG. 7A, the sheet handles 110 of build platform 100 include sections 700 having the shape of an upward-facing bowl that may catch liquid resin spilling from the build surface. The upward-facing bowl shape is shown in cross-section in inset 702. Other illustrative dripping-prevention structures are shown in cross-sections 704, 706 and 708, and illustrate protrusions that break the flow path of resin from the flexible sheet 112 to falling from the build platform.

Figure 7D:
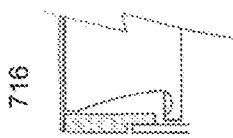
Figure 7D:
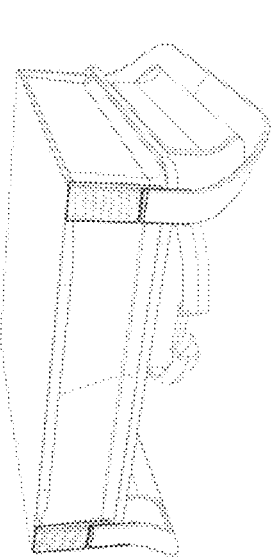
Figure 7F:
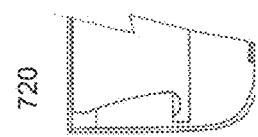
Figure 7F:
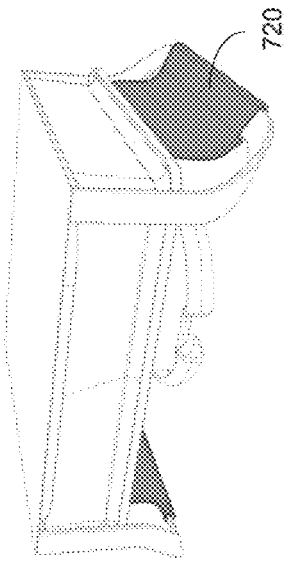

Other illustrative dripping-prevention structures include a kink 710 in the sheet handles 110 (as shown in FIG. 7B), cuts 712 in the sheet handles (as shown in FIG. 7C). Also pictured are multi-piece handle designs 714, 716 and 718 (shown in FIGS. 7D, 7E and 7F, respectively), and grips 724 (shown in FIG. 7I).

Figure 7H:
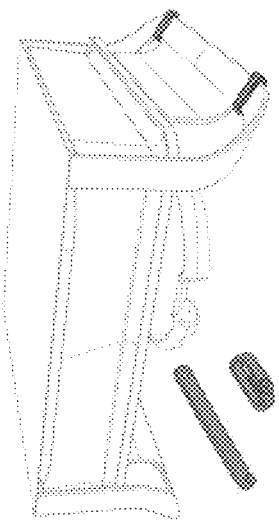
Figure 7E:
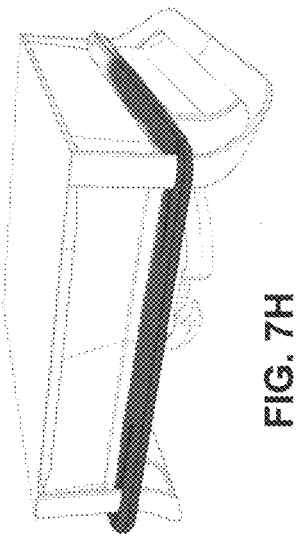
Figure 7E:
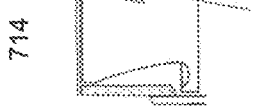
Figure 7G:
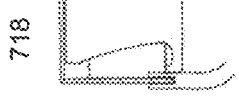
Figure 7I:
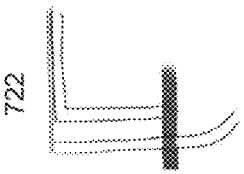

In the example of FIGS. 7G and 7H, a skirt is arranged attached to the sheet handles 110. In the case of skirt 720 shown in FIG. 7G, a structure (which may be flexible or rigid) is coupled between the top bar of a sheet handle and the top surface of the rigid structure 102. This skirt structure therefore inhibits resin from spilling off the flexible sheet 112 of the build platform and falling through the gap between the sheet handle and the build platform, when the build platform is oriented as shown in FIG. 7G. Instead, the skirt may catch the resin on its surface.

In the case of skirt 722 shown in FIG. 7H, a structure (which may be flexible or rigid) is coupled around the edge of the rigid structure 102 and sheet handles 110. This skirt structure therefore inhibits resin from spilling off the flexible sheet 112 of the build platform and falling beneath the build platform, when the build platform is oriented as shown in FIG. 7H. Instead, the skirt may catch the resin on its surface.

Figure 8B:
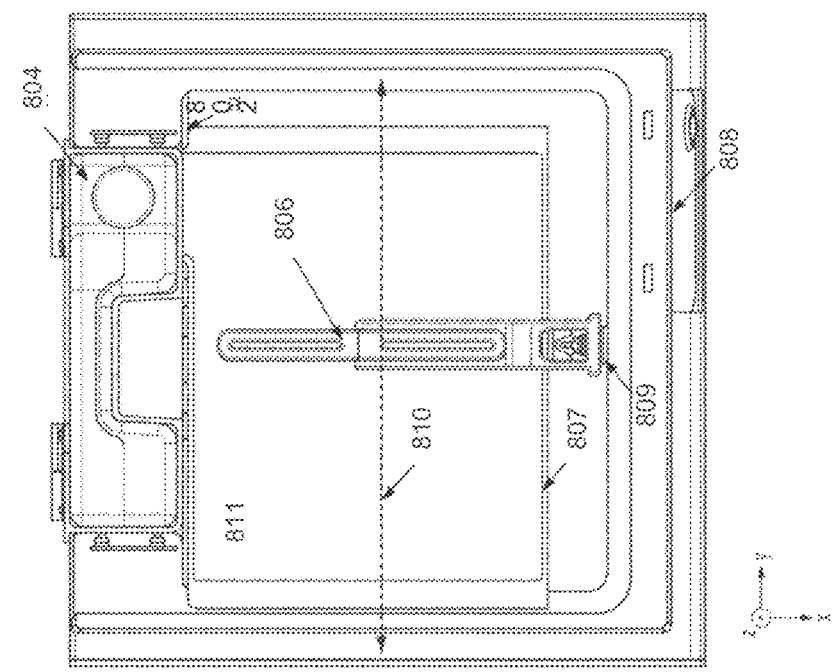
FIGS. 8A-8B depict an illustrative stereolithographic additive fabrication device, according to some embodiments.
Figure 8A:
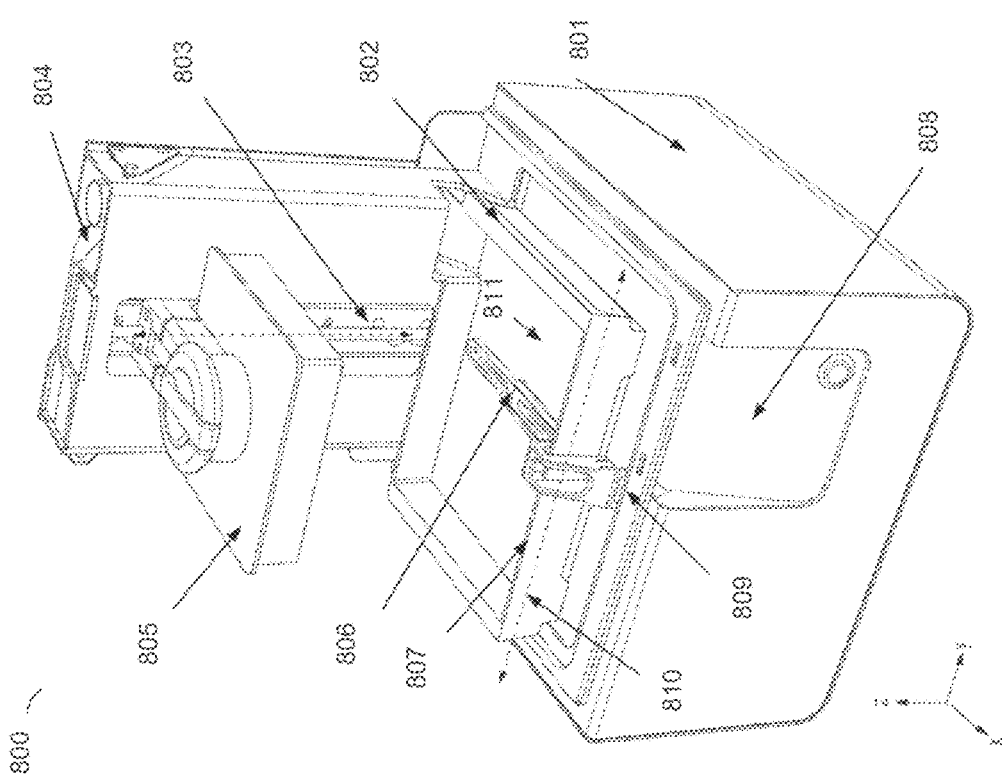

FIGS. 8A-8B depict an illustrative additive fabrication device comprising a build platform configured as per any of the embodiments discussed above. Illustrative stereolithographic printer 800 comprises a support base 801, a display and control panel 808, and a reservoir and dispensing system 804 for storage and dispensing of photopolymer resin. The support base 801 may contain various mechanical, optical, electrical, and electronic components that may be operable to fabricate objects using the system. During operation, photopolymer resin may be dispensed from the dispensing system 804 into container 802.

Build platform 805 may be positioned along a vertical axis 803 (oriented along the z-axis direction as shown in FIGS. 7A-7B) such that the bottom facing layer (lowest z-axis position) of an object being fabricated, or the bottom facing layer of build platform 805 itself, is a desired distance along the z-axis from the bottom 811 of container 802. The desired distance may be selected based on a desired thickness of a layer of solid material to be produced on the build platform or onto a previously formed layer of the object being fabricated. In the example of FIGS. 8A-8B, the build surface of the build platform 805 faces in the −z direction, towards the container 802.

According to some embodiments, build platform 100 as shown in FIG. 1A may be employed in system 800 as build platform 805. In some embodiments, the build platform 805 may be removable from the printer 800. For instance, the build platform 805 may be attached to arm 815 (e.g., pressure fit or fastened onto) and may be removed from the printer so that a part attached to the build surface can be removed via the techniques described above.

In the example of FIGS. 8A-8B, the bottom 811 of container 802 may be transparent to actinic radiation that is generated by a radiation source (not shown) located within the support base 801, such that liquid photopolymer resin located between the bottom 811 of container 802 and the bottom facing portion of build platform 805 or an object being fabricated thereon, may be exposed to the radiation. Upon exposure to such actinic radiation, the liquid photopolymer may undergo a chemical reaction, sometimes referred to as "curing," that substantially solidifies and attaches the exposed resin to the bottom facing portion of build platform 805 or to an object being fabricated thereon. FIGS. 8A-8B represent a configuration of stereolithographic printer 801 prior to formation of any layers of an object on build platform 805, and for clarity also omits any liquid photopolymer resin from being shown within the depicted container 802.

Following the curing of a layer of material, build platform 805 may be moved along the vertical axis of motion 803 in order to reposition the build platform 805 for the formation of a new layer and/or to impose separation forces upon any bond with the bottom 811 of container 802. In addition, container 802 is mounted onto the support base such that the stereolithographic printer 801 may move the container along horizontal axis of motion 810, the motion thereby advantageously introducing additional separation forces in at least some cases. A wiper 806 is additionally provided, capable of motion along the horizontal axis of motion 810 and which may be removably or otherwise mounted onto the support base at 809.

Figure 9:
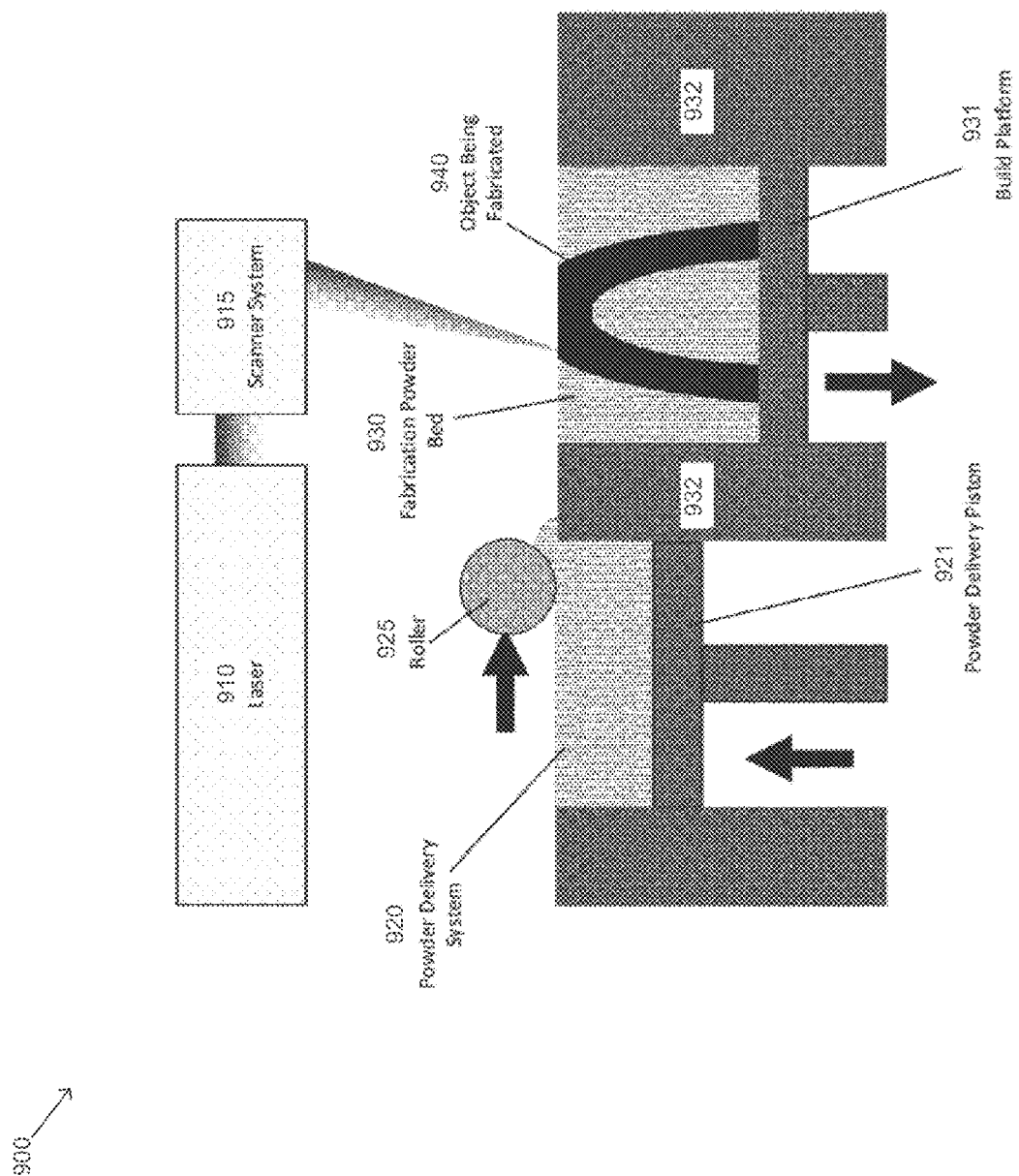
FIG. 9 depicts an illustrative selective laser sintering additive fabrication device, according to some embodiments.

FIG. 9 depicts an illustrative selective laser sintering (SLS) additive fabrication device comprising a build platform configured as per any of the embodiments discussed above. In the example of FIG. 9, SLS device 900 comprises a laser 910 paired with a computer-controlled scanner system 915 disposed to operatively aim the laser 910 at the fabrication bed 930 and move over the area corresponding to a given cross-sectional area of a computer aided design (CAD) model representing a desired part. Suitable scanning systems may include one or more mechanical gantries, linear scanning devices using polygonal mirrors, and/or galvanometer-based scanning devices.

In the example of FIG. 9, the material in the fabrication bed 930 is selectively heated by the laser in a manner that causes the powder material particles to fuse (sometimes also referred to as "sintering" or "consolidating") such that a new layer of the object 940 is formed. SLS is suitable for use with many different powdered materials, including any of various forms of powdered nylon. In some cases, areas around the fabrication bed (e.g., the walls 932, the platform 931, etc.) may include heating elements to heat the powder in the fabrication bed. Such heaters may be used to preheat unconsolidated material, as discussed above, prior to consolidation via the laser.

Once a layer has been successfully formed, the build platform 931 may be lowered a predetermined distance by a motion system (not pictured in FIG. 9). Once the build platform 931 has been lowered, the material deposition mechanism 925 may be moved across the fabrication bed 930, spreading a fresh layer of material across the fabrication bed 930 to be consolidated as described above. Mechanisms configured to apply a consistent layer of material onto the fabrication bed may include the use of wipers, rollers, blades, and/or other levelling mechanisms for moving material from a source of fresh material to a target location.

According to some embodiments, build platform 100 as shown in FIG. 1A may be employed in system 900 as build platform 931. In some embodiments, the build platform 931 may be removable from the system 900.

Since material in the powder bed 930 is typically only consolidated in certain locations by the laser, some material will generally remain within the bed in an unconsolidated state. This unconsolidated material is sometimes referred to as a "part cake." In some embodiments, the part cake may be used to physically support features such as overhangs and thin walls during the formation process, allowing for SLS systems to avoid the use of temporary mechanical support structures, such as may be used in other additive manufacturing techniques such as stereolithography. In addition, this may further allow parts with more complicated geometries, such as moveable joints or other isolated features, to be fabricated with interlocking but unconnected components.

The above-described process of producing a fresh layer of powder and consolidating material using the laser repeats to form an object layer-by-layer until the entire object has been fabricated. Once the object has been fully fabricated, the object and the part cake may be cooled at a controlled rate so as to limit issues that may arise with fast cooling, such as warping or other distortion due to variable rate cooling. The object and part cake may be cooled while within the selective laser sintering apparatus, or removed from the apparatus after fabrication to continue cooling. Once fully cooled, the object can be separated from the part cake by a variety of methods. The unused material in the part cake may optionally be recycled for use in subsequent fabrication.

According to some embodiments, a computer system may be provided suitable for generating instructions to perform additive fabrication by an additive fabrication device comprising a removable build platform (e.g., build platform 100, 120, 140 or 200, as shown in FIGS. 1A, 1B, 1C and 2A-2C, respectively). The computer system may execute software that generates two-dimensional layers that may each comprise sections of the object. Instructions may then be generated from this layer data to be provided to an additive fabrication device, that, when executed by the device, fabricates the layers and thereby fabricates the object. Such instructions may be communicated to the additive fabrication device via any suitable wired and/or wireless communications connection. In some embodiments, a single housing may hold the computing device and the additive fabrication device such that the link is an internal link connecting two modules within the housing of the system.

According to some embodiments, it may be beneficial to both increase the stability and/or adhesion of a fabricated part to a build layer and to improve the removability of the part by forming a structure, known as a "raft," on the build layer (e.g., prior to forming the first layer of the body of the part). As discussed in U.S. patent application Ser. No. 14/501,967, titled "Systems and Methods of Post-Processing Features for Additive Fabrication," filed on Sep. 30, 2014, which is hereby incorporated by reference in its entirety, such a raft structure may be added to the part for fabrication and subsequently removed in post-processing steps to leave only the desired part.

In some embodiments, a computer system configured to generate instructions to perform additive fabrication may optimize a raft structure in order to increase the effectiveness of part removal via the use of a removal mechanism or other means of distorting the build layer In particular, as discussed above, the forces applied against the base of a part attached to a build layer depend in part on the relationship of the radius of curvature of a bend in the build layer and the dimension of the part base along the axis of the bend. Accordingly, in some embodiments a computer system configured to generate instructions to perform additive fabrication may generate raft structures having a length configured to be greater along the bend axis of the build platform, in order to increase the degree of force applied to the raft during the removal process.

In some embodiments, a computer system configured to generate instructions to perform additive fabrication may generate a raft structure by taking into account a desired rigidity in a direction along the axis of the bend in the build layer during removal of a part. For example, the computer system may optimize a raft structure by increasing the rigidity of the structure against bending forces in the axis of the bend in the build layer. Such increases in rigidity may advantageously increase the amount of force potentially exerted between the bend in the build layer and the raft structure attaching the part to the build layer. For instance, generation of the raft by the computer system to increase strength, such as by forming thicker regions, ribbing, or other reinforcing structures, may help to counter this tendency, particularly in instances wherein the build material may be comparatively flexible or have low tensile strength.

In some instances, it may be further advantageous to conduct post-processing steps, such as thermal or actinic post curing of "green parts," appropriate to increase material strength or other properties prior to the application of removal forces. Alternatively, in fabrication technologies utilizing multiple or variable property materials, it may be advantageous to form one or more raft layers of materials having increased rigidity and strength as compared to one or more regions of the part.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A build platform configured to be removably attached to an additive fabrication device, the build platform comprising:
   a rigid structure; and
   an actuation structure coupled to the rigid structure and comprising at least two sheet handles and a flexible sheet, wherein the at least two sheet handles are attached to the flexible sheet,
   wherein a first surface of the flexible sheet forms a build surface on which the additive fabrication device is configured to form layers of material, and
   wherein the at least two sheet handles are configured to be actuated by moving the at least two sheet handles relative to one another, thereby causing at least a part of the flexible sheet to deform away from the rigid structure.

2. The build platform of claim 1, further comprising one or more magnets that couple the actuation structure to the rigid structure.

3. The build platform of claim 2, wherein a second surface of the flexible sheet is configured to be coupled to a first surface of the rigid structure, and wherein the first surface of the rigid structure includes:
   a first magnetic zone exerting a first amount of magnetic force per area on the actuation structure, and
   a second magnetic zone exerting a second mount of magnetic force per area on the actuation structure; and
   wherein the first amount is different from the second amount.

4. The build platform of claim 1, wherein the at least two sheet handles include a first sheet handle attached to a first side of the flexible sheet and a second sheet handle attached to the flexible sheet at a second side of the flexible sheet, opposite to the first side.

5. The build platform of claim 1, wherein the rigid structure includes a mounting device configured to be removably attached to the additive fabrication device.

6. The build platform of claim 1, wherein the at least two sheet handles each comprises a drip-prevention structure to catch liquid that drips from the flexible sheet when the build platform is oriented with the flexible sheet above the at least two sheet handles.

7. The build platform of claim 1, wherein the build platform is configured to be removed from the additive fabrication device and to be removably attached to a mount for the actuation of the at least two sheet handles.

8. The build platform of claim 1, wherein the rigid structure includes one or more troughs at its edges, and wherein a part of each of the at least two sheet handles rests in one of the one or more troughs.

9. The build platform of claim 2, wherein during actuation of the at least two sheet handles to apply a force to the flexible sheet:
   during a first phase of the actuation, an elastic force experienced by a first part of the flexible sheet is smaller than a magnetic force exerted on the first part of the flexible sheet by the one or more magnets;
   during a second phase of the actuation, the elastic force experienced by the first part of the flexible sheet is greater than the magnetic force exerted on the first part of the flexible sheet by the one or more magnets.

10. The build platform of claim 1, wherein the at least two sheet handles are configured to be actuated while at least a part of the actuation structure remains attached to the rigid structure.

11. The build platform of claim 1, wherein the actuation structure is coupled to the rigid structure through mechanical retaining means.

12. An additive fabrication device configured to form layers of material on a build surface, the additive fabrication device comprising:
   a build platform comprising:
      a rigid structure; and
      an actuation structure coupled to the rigid structure and comprising at least two sheet handles and a flexible sheet, wherein the at least two sheet handles are attached to the flexible sheet,
   wherein a first surface of the flexible sheet forms a build surface on which the additive fabrication device is configured to form layers of material, and
   wherein the at least two sheet handles are configured to be actuated by moving the at least two sheet handles relative to one another, thereby causing at least a part of the flexible sheet to deform away from the rigid structure.

13. The additive fabrication device of claim 12, wherein the build platform further comprises one or more magnets that couple the actuation structure to the rigid structure.

14. The additive fabrication device of claim 13, wherein a second surface of the flexible sheet is configured to be coupled to a first surface of the rigid structure, and wherein the first surface of the rigid structure includes:
   a first magnetic zone exerting a first amount of magnetic force per area on the actuation structure, and
   a second magnetic zone exerting a second mount of magnetic force per area on the actuation structure; and
   wherein the first amount is different from the second amount.

15. The additive fabrication device of claim 12, wherein the at least two sheet handles include a first sheet handle attached to a first side of the flexible sheet and a second sheet handles attached to the flexible sheet at a second side of the flexible sheet, opposite to the first side.

16. The additive fabrication device of claim 12, wherein the rigid structure includes a mounting device configured to be removably attached to the additive fabrication device.

17. The additive fabrication device of claim 12, wherein the at least two sheet handles each comprises a drip-prevention structure to catch liquid that drips from the flexible sheet when the build platform is oriented with the flexible sheet above the at least two sheet handles.

18. The additive fabrication device of claim 12, wherein the build platform is configured to be removed from the additive fabrication device and to be removably attached to a mount for the actuation of the at least two sheet handles.

19. The additive fabrication device of claim 12, wherein the rigid structure includes one or more troughs at its edges, and wherein a part of each of the at least two sheet handles rests in one of the one or more troughs.

20. The additive fabrication device of claim 13, wherein during actuation of the at least two sheet handles to apply a force to the flexible sheet:
   during a first phase of the actuation, an elastic force experienced by a first part of the flexible sheet is smaller than a magnetic force exerted on the first part of the flexible sheet by the one or more magnets;
   during a second phase of the actuation, the elastic force experienced by the first part of the flexible sheet is greater than the magnetic force exerted on the first part of the flexible sheet by the one or more magnets.

21. The additive fabrication device of claim 12, wherein the at least two sheet handles are configured to be actuated while at least a part of the actuation structure remains attached to the rigid structure.

22. The additive fabrication device of claim 12, wherein the actuation structure is coupled to the rigid structure through mechanical retaining means.

23. The build platform of claim 1, wherein the at least two sheet handles are configured to be actuated by moving the at least two sheet handles toward one another, thereby causing the at least a part of the flexible sheet to deform away from the rigid structure.

24. The additive fabrication device of claim 12, wherein the at least two sheet handles are configured to be actuated by moving the at least two sheet handles toward one another, thereby causing the at least a part of the flexible sheet to deform away from the rigid structure.

* * * * *